April 14, 1959 E. SOREF 2,881,486
METHOD AND APPARATUS FOR MAKING MOLDS IN WHICH
LAMINATIONS DEFINE A MATRIX
Filed March 24, 1954 4 Sheets-Sheet 1
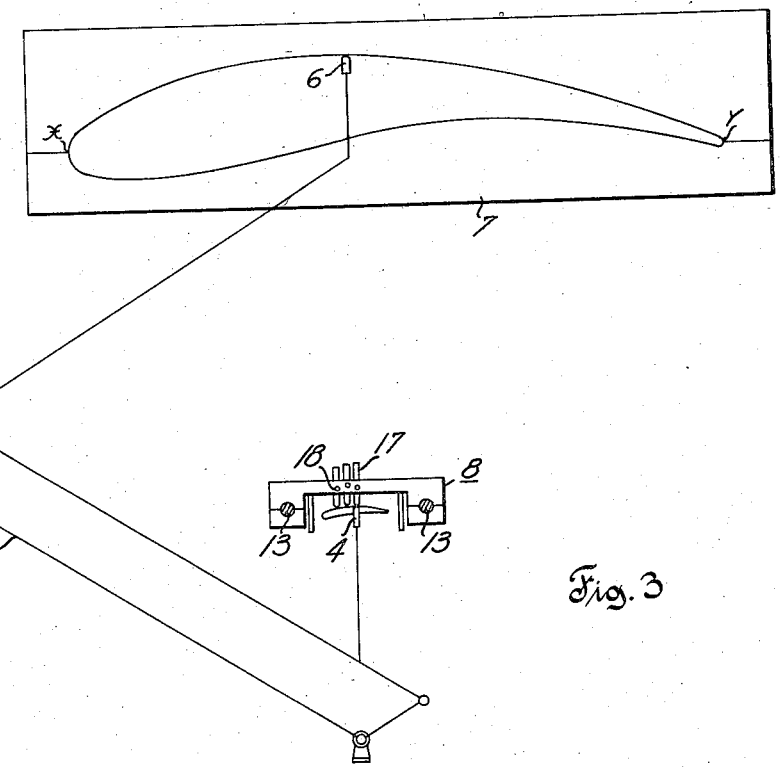
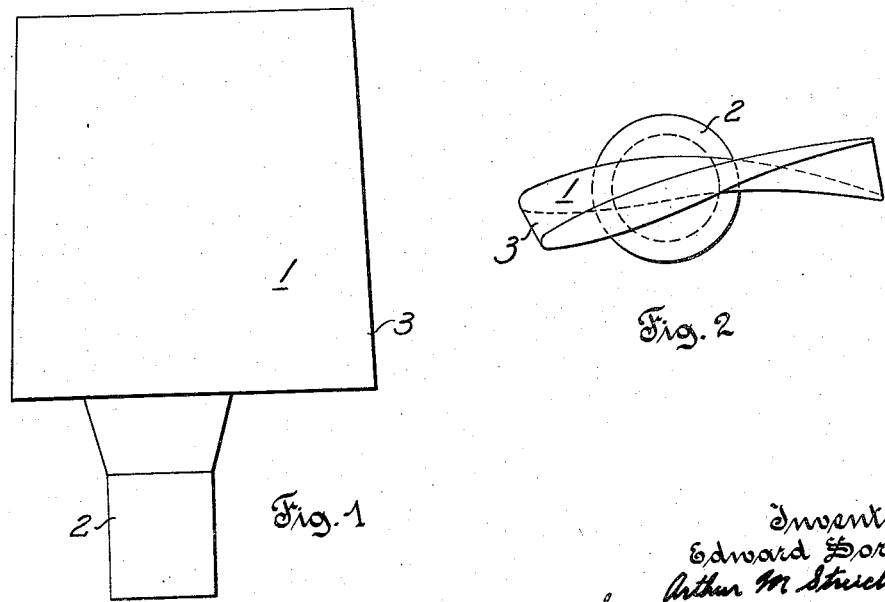
Inventor
Edward Soref
by Arthur M. Struch
Attorney April 14, 1959 E. SOREF 2,881,486
METHOD AND APPARATUS FOR MAKING MOLDS IN WHICH
LAMINATIONS DEFINE A MATRIX
Filed March 24, 1954 4 Sheets-Sheet 2

Inventor
Edward Soref
Arthur M. Streich
by Attorney

April 14, 1959　　　　　E. SOREF　　　　　2,881,486
METHOD AND APPARATUS FOR MAKING MOLDS IN WHICH
LAMINATIONS DEFINE A MATRIX Filed March 24, 1954　　　　　　　　　　4 Sheets-Sheet 3

Inventor
Edward Soref
by Arthur M. Streich
Attorney

Inventor
Edward Soref
by Arthur M Streich
Attorney

United States Patent Office 2,881,486
Patented Apr. 14, 1959

2,881,486

METHOD AND APPARATUS FOR MAKING MOLDS IN WHICH LAMINATIONS DEFINE A MATRIX

Edward Soref, Milwaukee, Wis., assignor to Allis-Chalmers Manufacturing Company, Milwaukee, Wis.

Application March 24, 1954, Serial No. 418,403

7 Claims. (Cl. 22—9)

This invention relates generally to a method and apparatus for making molds for articles having one or more curved surfaces and/or a twisted configuration. This invention is particularly useful for making molds for producing a wax image of an article used for reproducing the article in metal by well known precision investment casting techniques sometimes referred to as the "lost wax process."

In the past in order to precision cast articles by the "lost wax process" it has been the usual practice to first produce a hand made image of the article made of wood, plastic or metal. This hand made image is then used as a pattern for casting a mold which in turn is used to cast wax images for use in the "lost wax process." This procedure is very costly and time consuming because of the degree of skill and care required of an artisan to make the pattern image. The procedure is particularly costly and time consuming in the manufacture of blades for multistage compressors and turbines because the blades for each stage may be designed with different degrees of curvature and twist thus making necessary an additional pattern image for each stage of the machine. A primary object of the present invention is to provide a new and improved, faster and cheaper, method and apparatus for making a mold without the need for a costly pattern image.

It is another object of this invention to provide a new and improved method and apparatus for transferring contour lines from a drawing to matrix defining elements of mold making apparatus.

Objects and advantages other than those above set forth will be apparent as the description of the invention proceeds.

The novel features of the invention and how the objects are attained will appear from the specification and the accompanying drawings forming a part of this application, and all these novel features are intended to be pointed out in the claims.

In the drawings:

Fig. 1 is a side view of a compressor blade which is illustrative of the type of article that may be produced by this invention;

Fig. 2 is an end view of the blade shown in Fig. 1 and shows the twisted and curved shape of the body portion of the blade;

Fig. 3 is a diagrammatical illustration of one means for very accurately tracing a contour line within a mold making assembly from a drawing showing an enlarged contour line of an article to be produced by this invention;

Figure 24:
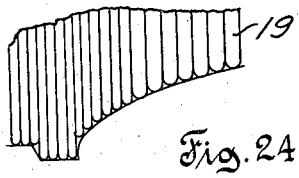
Figure 22:
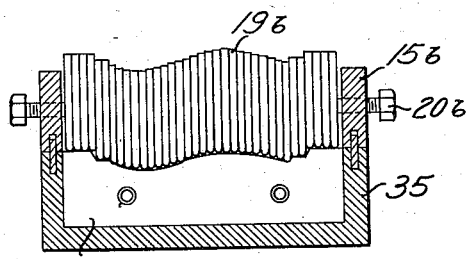
Fig. 22 is a sectional view showing a plurality of laminations engaging one of a pair of templates placed within a box like structure.
Figure 21:
Fig. 21 is a plan view of a template such as is shown in Fig. 19, but defining a different contour than that shown in Fig. 19.
Figure 23:
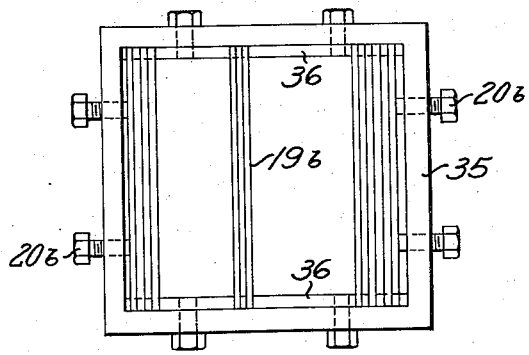

Fig. 23 is a top view of the box, templates and laminations shown in Fig. 22, with a number of laminations removed in order to show the manner in which the laminations engage and span the space between a pair of templates; and Fig. 24 is a fragmentary view of a group of laminations showing how relatively thin laminations can be used to define portions of a mold having relatively sharp curvature and a lesser number of relatively thicker laminations to define portions having less curvature.

In Figs. 1 and 2 of the drawings, a compressor blade 1 is shown which is illustrative of the type of article that can be produced by this invention. The blade 1 comprises a root portion 2 and a body portion 3. As shown in Fig. 2, the body portion 3 is designed to have an aerodynamic configuration having curved surfaces and the body portion twisted about a longitudinal axis passing through the center of the root portion.

To reproduce the blade contour with the required accuracy, a pair of drawings may be prepared, one showing an end view of the tip of the blade and the other showing in section the body portion 3 near the root portion 2. Both of these drawings are preferably drawn to an enlarged scale. Fig. 3 illustrates diagrammatically how one of such enlarged drawings is used. A stylus 4 is moved so as to trace a locus of points corresponding to the figure shown in the drawing but reduced in scale. This is accomplished with a comparator which may be, as illustrated for example, a pantograph 5 having a second stylus 6. The stylus 6 may be made to follow lines of one of the prepared drawings 7 and stylus 4 will very accurately reproduce the outline of drawing 7 to reduced scale. An assembly 8 is arranged relative to stylus 4 in a manner and for a purpose that will appear.

Figure 4:
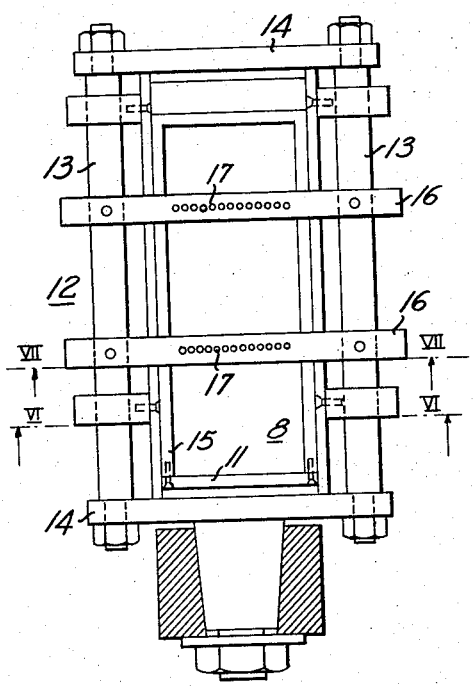
Fig. 4 is a plan view of the mold making assembly.
Figure 5:
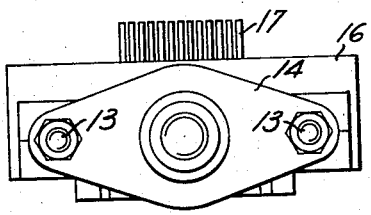
Fig. 5 is an end view of the assembly shown in Fig. 4.
Figure 6:
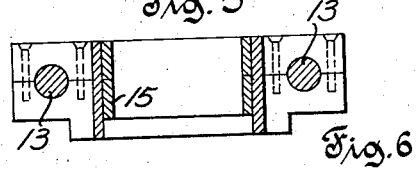
Fig. 6 is a view taken on line VI—VI of Fig. 4.
Figure 7:
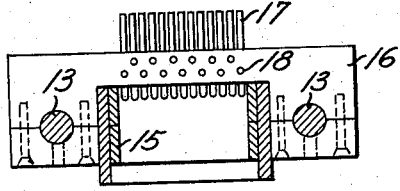
Fig. 7 is a view taken on line VII—VII of Fig. 4.

The assembly 8 is disclosed in greater detail in Figs. 4 through 7. The assembly 8 comprises an outer frame 12 made up of a pair of rods 13 which may be connected in parallel spaced arrangement, as shown, by a pair of end pieces 14. Means are provided on at least one of the end pieces for connecting the assembly to supporting structure (not shown) for supporting the assembly in proper alignment with the stylus 4 in a manner that will be described later. A rectangular mold frame 15 is mounted within the outer frame 12. Contour defining means which may include a pair of cross members 16 are mounted on rods 13 parallel to the end pieces 14. The cross members 16 are movable toward and away from each other. A plurality of pins 17 are slidably mounted in each of the cross members 16, perpendicular to a plane passing through the axis of rods 13 as shown in Figs. 4 and 7. Set screws 18 are provided to lock the pins 17 in the cross members 16.

Figure 8:
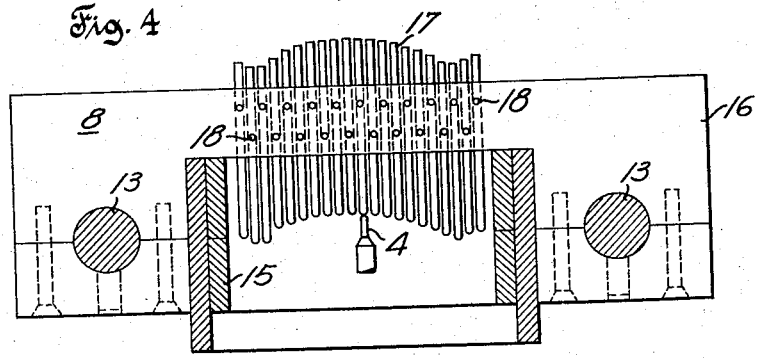
Fig. 8 is an enlarged view taken on line VII—VII of Fig. 4 showing how a stylus of the tracing means illustrated in Fig. 3 is used to position pins so that adjacent tips of the pins are arranged to reproduce a contour line appearing on a drawing.

The manner in which the apparatus is shown in Figs. 3 through 7 may be used to produce one half of a mold, is disclosed in Figs. 8 through 13. Fig. 8, like Fig. 7 but enlarged, is a view taken along plane VII—VII of Fig. 4, with the assembly 8 supported in a fixed position relative to stylus 4 so that when stylus 4 is equidistant between the sides of frame 15 stylus 6 will be equidistant between points X and Y on drawing 7 (Fig. 3).

When the assembly 8 is properly aligned, each pin 17 is so positioned that they locate a plurality of points which trace the outline of one half of the blade shown in the drawing 7 of Fig. 3. As shown in Figs. 3 and 8, this may be done by bringing stylus 4 into contact with the tip of a pin 17. Stylus 4 and the cooperating pin may then be moved together, maintaining contact therebetween until, as is shown in Fig. 3, stylus 6 is exactly on the outline of the blade on drawing 7. The pin is then locked in its supporting cross member 16 by tightening its set screw 18. This is then repeated for each pin to obtain an outline of one half of a blade contour within mold frame 15. This step is then repeated to position the pins 17 in the other cross member 16 using the other of the pair of drawings 7.

Figure 9:
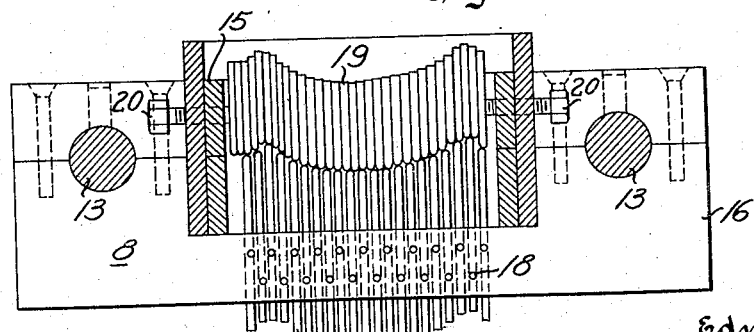
Fig. 9 is an enlarged view taken on line VII—VII of Fig. 4 with the assembly inverted from the position shown in Fig. 8, and shows a plurality of laminations placed to span the space between two groups of pins as shown in Fig. 4.

When the pins 17 in both cross members 16 have been properly positioned, the assembly 8 is inverted as shown in Fig. 9. A plurality of laminations 19 are placed within the mold frame 15. The edge of each of the laminations spans and abuts the space between the two rows of pins 17, forming a straight line defining the intermediate surface of the blade 1. The laminations 19 are secured within the mold frame 15 by screws 20, as shown in Fig. 9.

Figure 10:
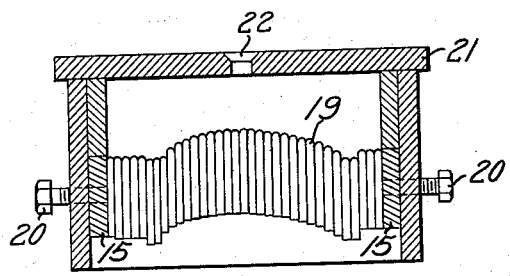
Fig. 10 is an enlarged sectional view of the laminations within a frame that has been removed from the assembly shown in Fig. 4, and shows a cover arranged to enclose a space partly defined by edges of the laminations and ready for pouring a solidifiable liquid material into this space to form a mold.
Figure 11:
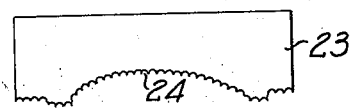
Fig. 11 is a sectional view of a mold piece as it appears when removed from the structure shown in Fig. 10.
Figure 12:
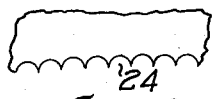
Fig. 12 is an enlarged fragmentary view of the mold piece showing grooves formed in the matrix of the mold piece due to the laminations of the matrix defining surface.
Figure 13:
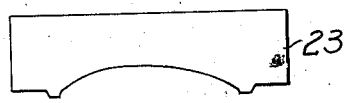
Fig. 13 shows the mold piece shown in Figs. 11 and 12 after a finishing operation has provided the matrix with a smooth surface.

The next step is to remove the mold frame 15 from the outer frame 12 and invert frame 15 as shown in Fig. 10. A cover 21 having a pour hole 22 is then placed over frame 15 and material which may be a relatively soft metal in a molten state is then poured through hole 22 to fill the space above the laminations 19. Although Fig. 10 is primarily intended to show frame 15 in a horizontal position, if Fig. 10 is considered as showing frame 15 in a vertical position, the mold can be made by providing a cover member 21 without a hole 22 and removing end piece 11 (see Fig. 4) of frame 15 in order to pour the mold forming material into the space defined by frame 15, cover 21 and laminations 19. After pouring the mold forming material, the material is solidified to form one half of a blade mold 23 as shown in Fig. 11. Because the metal is poured on the edges of the laminations 19 mold piece 23 will be left with grooves 24. The grooves 24 are shown magnified slightly in Fig. 12. The peaks of metal between grooves are then cut away to provide a smooth surface as shown in Fig. 13.

Figure 14:
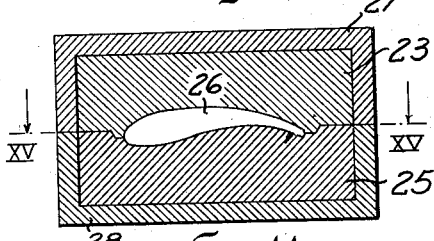
Fig. 14 is a sectional view of a pair of mold pieces cooperatively engaged to define a mold cavity ready to mold an image of the article shown on a drawing.
Figure 15:
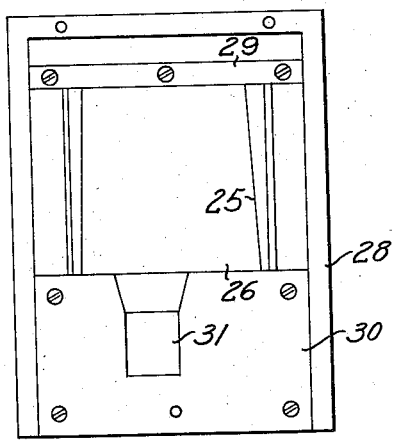
Fig. 15 is a view taken on line XV—XV showing one half of a completed compressor blade mold.

The entire procedure thus far described may then be repeated to make the opposing half section of blade mold 25 and the two complementary mold sections 23, 25 are then fitted together, as shown in Fig. 14, to define a complete mold cavity 26 for molding the body portion 3 of the blade 1 (Figs. 1 and 2). To form the root portion 2 of blade 1 the mold sections 23, 25 are each placed within a box 27, 28, respectively, as shown in Fig. 14. Fig. 15 is a plan view of mold section 25 in box 28. The root end of cavity 26 is enclosed by a mold piece 30 placed in box 28 which has a cavity 31 so shaped and arranged relative to cavity 26 so as to define the root portion 2 of blade 1. On the tip end of mold section 25 a wall 29 is inserted in box 28 to enclose the blade tip end of cavity 26. When a complete mold is constructed in this manner a wax image of a blade is cast for use in the well known precision investment casting process to reproduce the blade in metal. The use of the described apparatus in the method hereinbefore set forth makes it possible to produce articles such as blades having a curved and twisted configuration without the need for producing a master blade for use as a pattern.

Figure 16:
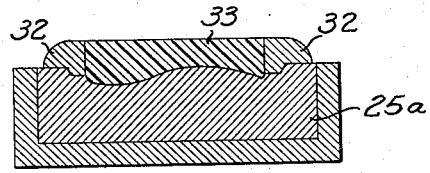
Fig. 16 is a sectional view of one half of a completed mold showing a modification of the invention in which the half mold forms a desired configuration for one half of a cast pattern image.
Figure 18:
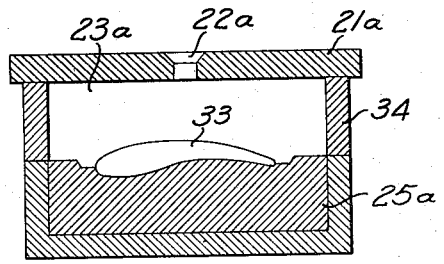
Fig. 18 is a sectional view of the mold shown in Fig. 16 and the pattern image finished as shown in Fig. 17 together with enclosing structure for casting a second mold piece cooperable with the mold piece shown in Fig. 16 to define a cavity conforming to the finished pattern image shown in Fig. 17.
Figure 17:
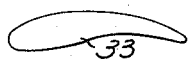
Fig. 17 is a sectional view of a cast pattern image, one half of which has been formed by the mold shown in Fig. 16 and remaining surface having been shaped by cutting away material.
Figure 20:
Fig. 20 is a top view of the contour defining edge of the template shown in Fig. 19.
Figure 19:
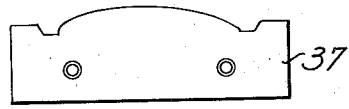
Fig. 19 is a plan view of a template for use in a modification of the invention in which a pair of templates are used to locate laminations within a mold frame, the templates being substituted for the pins shown in Fig. 9.

Since blades for turbines and blowers sometimes have one surface of simple curvature and another relatively complex it may be desirable to make only the more complex of the mold sections by the hereinbefore described method. Referring to Fig. 16, a mold section 25a may be made in the hereinbefore described manner. A pair of strips 32 may then be placed on mold section 25a, one on each side of the blade contour. The space between strips 32 is then filled with plastic material 33 that will solidify. The plastic material is one which can be shaped in a solid state. One plastic material suitable for this purpose available to the trade is called "Epoxy." After the plastic material 33 has solidified the strips 32 are removed from mold section 25a and the plastic material then shaped on its obverse side to produce the contour of the other side of a blade as shown in Fig. 17. Since this portion of blade contour is of relatively simple curvature this step may be performed by hand using a simple cutting tool. Next, a mold frame 34 is placed on top of mold section 25a, as shown in Fig. 18. A cover 21a having a pour hole 22a is then placed on top of frame 34 and molten metal poured into frame 34 to form a second mold section 23a. A thin layer of sand may be spread on the top of the lower mold section 25a and the plastic 33 to prevent the plastic material fusing with the molten metal. The sand layer will also facilitate breaking the mold sections apart after the molten metal has solidified. This procedure also provides a pair of mold sections 25a, 23a which can be used to cast wax blades for use in the precision investment casting process and eliminates the need for a completely hand made pattern blade.

Still another modification of the hereinbefore described method of making a pair of mold sections, will be disclosed with reference to Figs. 19 through 23. The general procedure is modified in that contour defining means comprising templates 36, 37 are used to position laminations in place of the pins 17. To use templates in place of pins, a box 35 is provided as shown in Fig. 22 for receiving and holding a pair of templates 36. The templates 36 are shaped to conform to the desired contour of one side of a blade, see also Fig. 21. Another pair of templates 37 are prepared conforming to the contour of the other side of a blade (see Figs. 19 and 20). To make one half of a mold, one pair of templates is placed in the box 35 in the manner shown in Fig. 23 which views the position of the templates from above. A frame 15b is placed on top of the box 35 as shown in Fig. 22 and laminations 19b placed in the box. The laminations are then secured within box 35 by screws 20b. Box 35 and laminations 19b are then used to produce one half of a mold in the same manner illustrated in Figs. 10 through 13. This procedure is then repeated using the templates 37 to make another half mold complementary to the first and the two halves are used to provide a complete mold in the same manner illustrated in Figs. 14 and 15.

From the foregoing it will be apparent to those skilled in the art that the illustrated embodiments of the invention provide a new and improved method and apparatus for making molds and accordingly accomplishes the objects of the invention. On the other hand, it will also be obvious to those skilled in the art that the illustrated embodiments of the invention may be variously changed and modified, or features thereof, singly or collectively, embodied in other combinations than those illustrated without departing from the spirit of the invention. Accordingly, the disclosure herein is illustrative only and the invention is not limited thereto.

It is claimed and desired to secure by Letters Patent:

1. Apparatus comprising in combination: a frame having at least one pair of opposite side pieces spaced apart from each other; first and second means spaced apart from each other and arranged within said frame, means connected to said frame and engageable with said first and second means to firmly secure said first and second means within said frame; said first and second means defining contours conforming to first and second contours of an article respectively; a plurality of laminations arranged within said frame contiguously to each other, said laminations disposed in perpendicular relation to a plane defined by a longitudinal center line of each of said side pieces, a straight edge of each of said laminations spanning and abutting the contours of said first and second means, said edges cooperating with each other to provide a surface conforming to the contours of said first and second means; and means connected to said frame and engageable with said plurality of laminations to firmly secure said laminations within said frame whereby said first and second means may be removed from said frame and solidifiable material in a fluid state poured into a space defined at least in part by said surface whereupon solidifying of said material conforms to said surface.

2. Apparatus comprising in combination: a frame having at least one pair of opposite side pieces spaced apart from and parallel to each other; first and second contour defining means spaced apart from each other perpendicular to said side pieces and arranged within said frame, means connected to said frame and engageable with said first and second means to firmly secure said first and second means within said frame; said first and second means defining contours conforming to first and second contours of an article respectively; a plurality of laminations arranged within said frame contiguously to each other, said laminations disposed in perpendicular relation to a plane defined by a longitudinal center line of each of said side pieces, an edge of each of said laminations disposed parallel to said side pieces and spanning and abutting the contours of said first and second means, said edges cooperating with each other to provide a bottom surface between said side pieces conforming to the contours of said first and second means; and means connected to said frame and engageable with said plurality of laminations to firmly secure said laminations within said frame whereby said first and second means may be removed from said frame and solidifiable material in a fluid state poured into said frame and upon said surface whereupon solidifying of said material conforms to said surface.

3. Apparatus comprising in combination: a frame having at least one pair of opposite side pieces spaced apart from each other; first and second template means spaced apart from each other and arranged within said frame, means connected to said frame and engageable with said first and second means to firmly secure said first and second means within said frame; said first and second templates defining contours conforming to first and second contours of an article respectively; a plurality of laminations arranged within said frame arranged contiguously to each other, said laminations disposed in perpendicular relation to a plane defined by a longitudinal center line of each of said side pieces, a straight edge of each of said laminations spanning and abutting the contours of said first and second templates, said edges cooperating with each other to provide a surface conforming to the contours of said first and second templates; and means connected to said frame and engageable with said plurality of laminations to firmly secure said laminations within said frame whereby said first and second templates may be removed from said frame and solidifiable material in a fluid state poured into a space defined at least in part by said surface whereupon solidifying of said material conforms to said surface.

4. Apparatus comprising in combination: a frame having at least one pair of opposite side pieces spaced apart from each other; first and second means spaced apart from each other and arranged within said frame; means connected to said frame and engageable with said first and second means to firmly secure said first and second means within said frame; a first and second group of pins supported by said first and second means respectively; setting means for adjustably securing said pins relative to said means so that adjacent ends of said first and second groups of pins define contours conforming to first and second contours of an article respectively; a plurality of laminations arranged within said frame contiguously with a straight edge of each of said laminations spanning and abutting said first and second group of pins, each of the said laminations being disposed in parallel relation to a plane defined by a pin of said first group and a correspondingly located pin of said second group, said edges cooperating with each other to provide a surface conforming to the contours defined by first and second groups of pins; and means connected to said frame and engageable with said plurality of laminations to firmly secure said laminations within said frame whereby said first and second means and groups of pins may be removed from said frame and solidifiable material in a fluid state poured into a space defined at least in part by said surface whereupon the solidification of said material, the material conforms to said surface.

5. A method of making a mold for an article having a curved surface comprising the steps of providing a frame with at least a pair of side pieces spaced apart from each other; providing first and second means with respective first and second contours conforming to first and second contours of said article; placing said contour defining means within said frame and spaced apart from each other; placing a file of laminations within said frame in perpendicular relation to a plane defined by a longitudinal center line of each of said side pieces to substantially fill the space between said side pieces and with said laminations spanning the space between said contours with a straight edge that abuts both contours to thereby provide a surface conforming to the contours defined by said first and second contour defining means; securing said laminations within said frame; removing said first and second contour defining means from said frame; pouring a mold forming solidifiable material in a fluid state into a space defined at least in part by said surface; and solidifying said material to provide a mold having a matrix conforming to said surface.

6. A method of making a mold for an article having a curved surface comprising the steps of providing a frame with at least a pair of side pieces spaced apart from each other; providing first and second members with respective first and second groups of adjustably positionable pins spaced apart from each other within said frame; adjusting the position of said pins relative to said members so that adjacent ends of said first and second groups of pins define contours conforming to first and second contours of said article; placing a file of laminations within said frame in perpendicular relation to a plane defined by a longitudinal center line of each of said side pieces to substantially fill the space between said side pieces and with said laminations spanning the space between said first and second groups of pins with a straight edge that abuts both contours defined by said pins to thereby provide a surface conforming to the contours defined by said first and second groups of pins; securing said laminations within said frame; removing said first and second members and groups of pins from said frame; pouring a mold forming solidifiable material in a fluid state into a space defined at least in part by said surface; and solidifying said material to provide a mold having a matrix conforming to said surface.

7. Apparatus comprising in combination: a frame having at least one pair of opposite side pieces spaced apart from each other; contour defining means arranged within said frame defining contours conforming to contours to be reproduced; means connected to said frame and engageable with said contour defining means to secure said contour defining means within said frame; a plurality of contiguous laminations arranged within said frame in perpendicular relation to a plane defined by a longitudinal center line of each of said side pieces; means connected to said frame having a first position supporting said laminations in said perpendicular relation with said longitudinal center line of said side pieces; a straight edge of each of said laminations in abutting contact with said contour defining means providing a surface accepting the contours defined by said contour defining means; said means supporting said laminations having a second position for securing said laminations firmly in position after the contours of said contour defining means have been accepted by said laminations whereby said contour defining means may be removed from said frame and solidfiable material in a fluid state poured into a space defined at least in part by said surface, said material upon solidification conforming to said surface.

References Cited in the file of this patent

UNITED STATES PATENTS

| | | |
|---|---|---|
| 1,826,783 | Hess | Oct. 13, 1931 |
| 2,274,060 | Hart | Feb. 24, 1942 |
| 2,410,888 | Lucy | Nov. 12, 1946 |
| 2,442,022 | Schulz | May 25, 1948 |
| 2,543,184 | Marvosh | Feb. 27, 1951 |